Patented Apr. 5, 1927.

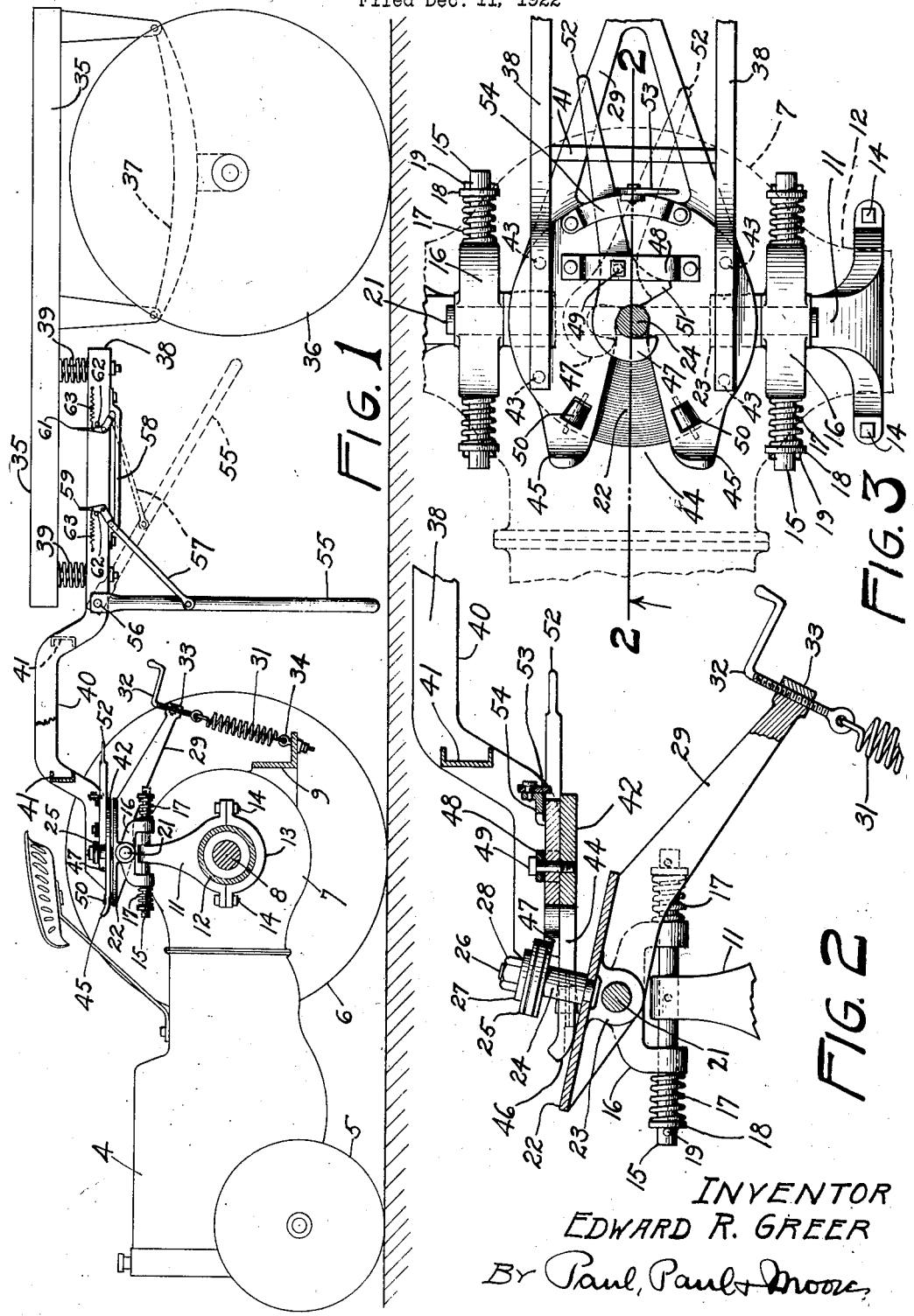

1,623,179

UNITED STATES PATENT OFFICE.

EDWARD R. GREER, OF MINNEAPOLIS, MINNESOTA, ASSIGNOR TO TRAIL-IT COMPANY, OF MINNEAPOLIS, MINNESOTA, A CORPORATION OF MINNESOTA.

TRACTOR HITCH.

Application filed December 11, 1922. Serial No. 606,117.

This invention relates to new and useful improvements in tractor hitches such as are commonly used to connect or couple a trailer to a tractor, motor truck or any other vehicle, and more particularly relates to such hitches or couplings used in connection with small tractors of the general type of the well-known Fordson tractor.

Small tractors such as the above, often have the trailer coupling connection mounted above the rear driving axle and housing, substantially upon the same level as the side members or beams of the trailer, and also at approximately the same level as the usual trailer coupling ordinarily provided upon a motor truck chassis. The purpose of so mounting the coupling upon the tractor is to facilitate turning corners and also to provide means whereby the trailer may be interchangeably connected to either a tractor or motor truck without having to resort to any mechanical changes.

When using a coupling thus mounted, considerable difficulty is sometimes experienced in retaining the forward end of the tractor upon the ground, especially when hauling a heavy load. This difficulty is caused by the " point of pull," of draw-bar connection being located a considerable distance above the plane of contact of the driving or traction wheels with the ground. As the tractor moves forwardly a backward pull is exerted upon the coupling by the drawn load, thereby tending to raise the forward end of the tractor. The points of contact of the traction wheels with the ground function as fulcrums upon which the tractor body tends to rotate. Such tendency may manifest itself in lessened effectiveness of steering control as the front wheels rest more and more lightly upon the ground, or, in a complete elevation of the front end of the tractor. In ordinary use, however, the weight of the forward end of the tractor is often sufficient to counteract this action and thus prevent the forward wheels from lifting or " rearing up," but instances have occurred where the tractor has turned completely over, seriously, and in some instances fatally, injuring the operator.

In the construction of this novel coupling or hitch, illustrated in the accompanying drawings, the above disadvantages have been entirely eliminated. Means are provided for positively preventing the forward end of the tractor from rearing-up or lifting when hauling a heavy load as well as for preventing loss of steering traction. Such means are adjustable to counteract the lifting tendency caused by the draft of the trailer, the term trailer being used herein to include plows, sleds, etc. or wheeled vehicles as well as similar trailed objects wherein a portion of the trailed load is placed upon the tractor and the trailer front is substantially parallel to the ground. This adjustment may be regulated to correspond to the size of the load to be hauled. Generally this invention includes the provision of a coupling member adapted to be secured to a trailer and a complementary coupling element on the tractor, the tractor element being pivotally mounted. The operative connection between the trailer member and tractor element is such as to maintain the pivotal tractor element in its normal position which is here shown as substantially horizontal while such connection permits the pivotal movement between these parts necessary for the turning travel of the tractor. Furthermore, an operative connection is provided between the pivoted tractor element and the tractor frame in order to exert a downward force upon the front end of the tractor.

Another important feature of this coupling or fifth wheel resides in the fact that it is resiliently mounted upon the frame of the tractor or motor truck, thus permitting the load to be started without a jerk or sudden jolt. The inclined position assumed by the coupling or fifth wheel when disconnected from its load provides means whereby it may be readily and quickly connected to the trailer half-coupling. This coupling is also constructed in such a manner as to permit the tractor to be turned at an angle of approximately ninety degrees when turning corners, if desired.

The object therefore of this invention is to provide an improved tractor hitch.

Other objects of the invention will more fully appear from the following detailed description and the accompanying drawings and will be pointed out in the annexed claims.

In the drawings there has been disclosed a structure designed to carry out the objects of the invention but it is to be understood that the invention is not confined to the exact features shown, as various changes may be made within the scope of the claims which follow.

In the drawings:

Figure 1 is a view in side elevation and partially in vertical section, showing a tractor with the invention applied thereto;

Figure 2 is a detail vertical sectional view on the line 2—2 of Figure 3, showing the relative position of the parts before the two halves of the coupling are interlocked; and Figure 3 is a plan view, partially in section, of a portion of a tractor rear end, showing the two halves of the coupling interlocked.

In the selected embodiment of the invention here shown, for purposes of disclosure, there is illustrated a tractor of usual construction comprising a body 4, front and rear wheels 5 and 6, gear housing 7, rear driving axle 8, and the usual drawbar 9.

The tractor element of this novel hitch is indirectly supported by a pair of similar opposed upright supporting brackets 11 which may be secured to the reduced portions 12 of the housing 7 by any suitable means such as the caps 13 and bolts 14. The upwardly extending ends of these brackets are preferably curved slightly inwardly, as shown in Figure 3, to provide a supporting means for the parallel guide rods or shafts 15 fixedly secured thereto. A pair of suitable yoked brackets 16 are slidably mounted upon these rods and are resiliently held in their normal position, preferably by means of coiled compression springs 17. These springs are interposed between the outer ends of the brackets 16 and suitable collars or washers 18 also mounted upon the rods 15 and prevented from outward movement thereon by the pins 19 secured to the rods. A suitable shaft 21 is mounted in the yoked brackets 16 at substantially right angles to the rods 15 (Figure 3).

The preferred form of the tractor element of this novel hitch is shown as a circular disk or fifth wheel 22 which has integral bearings 23 which are loosely mounted upon the shaft 21, so that the fifth wheel may oscillate or rock thereon within predetermined limits. Such limits occur when the under face of the plate 22 strikes the rear axle housing and when the lever arm 29 does the same at the rear of the tractor. A suitable stud or draw-pin 24 is secured to the center of the fifth wheel 22 and extends upwardly therefrom to support a suitable thrust bearing 25. This stud is preferably formed with a threaded reduced end portion 26 to receive a lock-nut 28 and washer 27 providing a suitable shoulder against which the thrust bearing is securely clamped. A forked arm 29, preferably integral with the fifth wheel 22 and bearings 23, extends rearwardly and downwardly therefrom to support one end of a helical tension spring 31. This spring is connected to the arm 29 by means of a crank rod 32 received in threaded engagement in the capped bearing 33 provided at the lower terminal end of the arm 29. The other end of the spring 31 is secured to the tractor body or frame at any suitable point. A convenient connection is afforded by means of an eyebolt 34 rotatably mounted on the usual drawbar 9. Thus, by rotating the crank rod 32 the tension of the spring 31 may be increased or decreased, as desired. The uncoupled tractor element or fifth wheel is thus yieldably held by the spring in a downwardly and rearwardly inclined position which facilitates the coupling operation.

The trailer member of this novel hitch is provided by the pair of arched draft bars 38 upon which the forward end portion of the trailer frame 35 is preferably yieldably mounted. This trailer frame is shown as carried by a pair of wheels 36 through a common form of semi-elliptic springs 37. This yieldable mounting of the forward portion of the trailer frame may be effected by the coiled compression springs 39 interposed between the bottom face of the frame 35 and the upper face of the rear portion of the bars 38. Suitable cross-members 41 are preferably interposed between the draft bars and secured thereto in any suitable manner to provide a rugged and substantial draft bar frame. A relatively short turning radius is permitted by the integral arched portions 40 of the draft bars 38. These arched portions afford the desired overhead clearance for the relatively large rear traction or driving wheels 6 so that engagement of the bars 38 and wheels 6 is avoided when the bars 38 are laterally displaced in turning movements of the tractor and trailer.

A substantially circular member, such as the plate 42, is preferably secured to the under side of the forward end of the draft bars 38 as by rivets or bolts 43. This plate is provided with a triangular opening or slot 44 extending outwardly and forwardly from its center and adapted to receive the draw-pin 24, secured to the circular disk 22 as shown in Figure 3. Suitable guide lugs 45 are also provided upon the plate 42 adjacent each side of the opening 44 and are preferably integrally formed therewith. The terminal ends of these lugs are preferably upwardly turned as indicated in Figure 2, thereby providing curved surfaces 46, adapted to engage the top surface of the fifth-wheel 22 and thus guide the plate to its seat upon the wheel when the two members are being coupled together. Suitable anti-friction rollers 50 are provided in each of the lugs 45 adapted to travel upon the surface of the fifth wheel 22 to carry the weight of the load when the trailer is connected to the tractor.

Means are also provided for automatically and positively locking the plate 42 in place upon the wheel 22 after the plate has been properly seated thereon. A suitable coupling hook 47 is pivotally mounted upon the plate 42 by means of a bracket 48 and pivot bolt 49 secured to the top face of the plate 42. The hook 47 is provided with an integral lug 51 and a rearwardly extending arm 52. The hook is adapted to engage the draw-pin 24 and may be retained in such engagement by means of a suitable latch 53 pivotally mounted upon a bracket 54 secured to the plate 42. The latch is adapted to engage the arm 52 and thus positively retain the hook in its locking position. The bracket 54 also functions as a means for supporting the arm 52. When it is desired to disconnect the trailer from the tractor, the operator will manually raise the latch 53 thereby releasing or unlocking the arm 52 and permitting it to be moved from the full line to the dotted line position as indicated in Figure 3. When in this position, the hook 47 will be out of engagement with the draw-pin 24 and the fifth wheel 22 may be moved out of engagement with the plate 42, thus disconnecting the trailer from the tractor.

Means are also provided for supporting the forward end of the trailer upon the ground when disconnected from the tractor. Such supporting means are conveniently afforded by a supporting member 55, preferably U-shaped, which is pivotally mounted upon the draft bars 38 by means of suitable pivot bolts or pins 56. A diagonal brace rod 57, also preferably U-shaped, has its ends pivotally connected to the straight portions of the supporting member 55. The base of this U-shaped brace extends transversely from side to side of the draft bar frame. Suitable bearings or guide bars 58 are preferably secured to the under-side of the draft bars 38 to provide guideways for the brace rod 57 which is slidably mounted therein.

Suitable dogs or latches 59 and 61 are pivotally mounted preferably upon the outside face of one of the draft bars 38. These dogs are yieldably held against suitable stops 62 by means of the coiled springs 63, each spring having one end secured to the draft bar 38 while the other end of each spring is connected to the dogs 59 and 61. Thus, when the trailer is disconnected from the tractor its forward end or the draft bar frame will be supported by means of the U-shaped supporting member 55 resting upon the ground. When the member 55 is in its supporting position, or that shown in full lines in Figure 1, the dog 59 will be in engagement with the brace rod 57, thereby providing a means for positively preventing folding or rearward movement of the supporting member 55 and the brace rod 57. On the other hand, when the trailer has been coupled or connected to the tractor, the supporting member 55 may be folded or swung upwardly, as indicated by dotted lines, by simply raising the dog 59 thereby permitting the brace rod 57 to be moved rearwardly to the limit of its movement in which position it will be securely locked by means of the dog 61.

When it is desired to couple or connect the tractor to the trailer, the tractor will be moved backward towards the trailer so that the draw pin 24 is in alinement with the opening 44 between the lugs 45. The fifth wheel 22 will engage the upturned guide lugs 45 provided on the circular plate 42, as indicated in Figure 2. As the tractor continues its backward movement, the draft-bars 38 and the forward end of the trailer will be slightly elevated due to the lugs 45 traveling upwardly upon the inclined face of the fifth wheel 22. As soon as the lugs have passed beyond the axis of the shaft 21, the weight of the forward end of the trailer resting upon the inclined wheel 22 will tend to lower the forward high side of the wheel against the tension of the spring 31. When the weight of the load, resting upon the fifth wheel 22, has moved beyond the center sufficiently to counteract the tension of the spring 31, the spring will yield permitting the wheel 22 to rock upon the shaft 21 until its top surface substantially coincides with the lower surface of the plate 42. The wheel 22 carrying the draw-pin 24 will then move rearwardly until the pin engages the lug 51 provided on the hook 47. As soon as the draw-pin engages this lug the hook will automatically be moved from the dotted to the full line position passing between the top surface of the wheel 22 and the under side of the thrust bearing 25 around the draw pin 24. This automatic interengagement is effected by locating the pivot bolt 49 to one side of the longitudinal center line of the draft bar frame and plate 42. When the hook is in this position, the latch 53 will be brought into engagement with the arm 52 and thus will positively prevent the hook from becoming disengaged from the draw pin until the operator manually releases the arm 52 by raising the latch 53. As soon as the trailer has been securely coupled to the tractor the operator raises the dog 59 and moves the supporting member 55, now free from the ground, from the full to the dotted line position. In such position, the dog 61 will engage the brace rod 57 and retain the supporting member in its raised or inoperative position.

While this novel hitch is one adapted to facilitate coupling and uncoupling of a trailer, its greatest advantage resides in its counteraction of the dangerous tendency of the front end of a tractor to raise when drawing a load. Such advantage may be pointed out somewhat in detail. Referring to Figure 1, it will be noted that, as the tractor commences to move forwardly, a backward pull will be exerted upon the draw-pin 24 as a result of the trailer being connected thereto by means of the plate 42 and hook 47. This backward pull will tend to tilt the fifth wheel 22 from its horizontal or operative position (Fig. 1) toward the inclined or inoperative position (Fig. 2) but is prevented therefrom by means of the anti-friction rollers 50 bearing down upon the forward portion of the fifth wheel 22 and the hook 47 bearing upwardly against the under side of the thrust bearing 25. In this position the parts are securely interlocked. However, the plate 42 will be free to rotate upon the wheel 22 when turning corners.

Now, as the fifth wheel 22 cannot change its horizontal position with reference to the plate 42, the backward pull thereon, caused by the drawn trailer, will tend to lift or cause the forward end of the tractor to rear up with the contact points of the rear tractor wheels with the ground functioning as a fulcrum upon which the tractor body tends to pivot. To counteract this lifting action of the forward end, the operator adjusts the tension of the spring 31, by means of the crank rod 32, until the downward force exerted upon the forward end of the tractor by means of this adjustment is sufficient substantially to neutralize such lifting action.

This neutralizing action or counteraction is accomplished in the following manner: The fifth wheel 22 and plate 42 can not change their relative positions horizontally because they are interlocked as above described. The forked arm 29 will also be prevented from up and down movement as it is integral with the wheel 22. Now, as the forward end of the tractor commences to lift, due to the backward pull upon the hitch, the draw-bar 9 will tend to move downwardly with the line of contacts of ground and rear wheels as an axis, thereby increasing or tending to increase, the distance between the arm 29 and the draw-bar 9. This increase of distance results in stretching the tension spring 31. It will also be noted that increase of such distance proportionately increases the tension of the spring. If it be found that the lifting force on the forward end of the tractor, when hauling a trailer load, is great enough to cause the spring 31 to yield and permit such forward lifting, then, the operator may rotate the crank rod 32 thereby increasing the tension of the spring 31 until the tensioned force exerted downwardly upon the forward end of the tractor will be sufficient to counteract the opposed force acting thereon and thus eliminate the danger of rearing up of the forward end. Furthermore, not only does this counteraction prevent raising of the front end from the ground, but it also assures sufficient tractive engagement of the front steering wheel with the ground so that the tractor may accurately be steered. Actual use of common types of trailer couplings has demonstrated that, although the front end of the tractor does not leave the ground, yet the front wheels rest too lightly thereon to effect their steering function.

When it is desired to disconnect the trailer from the tractor, the operator may lower the supporting member 55 from the dotted line to the full line position (Fig. 1) by releasing the brace rod 57 from the dog 61. The arm 52 may then be released by raising the latch 53 and the arm moved from the full to the dotted line position (Fig. 3) thereby releasing the draw-pin 24 from the hook 47 and permitting it to become disengaged therefrom. As the tractor becomes disconnected from the trailer, the forward end of the trailer will again be supported by means of the supporting member 55 resting upon the ground, and the disk 22 will assume its inoperative or inclined position shown in Figure 2.

This trailer hitch therefore provides a practical inexpensive and efficient means for hitching or coupling a trailer to a tractor, truck or other self-propelled vehicle and obviates the dangerous rearing as well as the rearing tendency which is destructive of the steering functions of the front wheels.

I claim as my invention:

1. A tractor hitch including a member adapted to be secured to a trailer, an element adapted to be mounted to rock upon the tractor, means to connect the member and element to maintain the element in normal position and to permit relative pivotal movement upon turning travel of the tractor and tension means connected to the element adapted to rock on the tractor and to the tractor to exert a downward force upon the front end of the tractor substantially sufficient to counteract any tendency thereof towards upward movement.

2. A tractor hitch including a member adapted to be secured to a trailer, an element adapted to be mounted to rock upon the tractor, means to connect the member and element to maintain the element in normal position and to permit relative pivotal movement upon turning travel of the tractor, tension means connected to the element and to the tractor to exert a downward force upon the front end of the tractor, and means to adjust the tension means whereby said downward force may be varied.

3. A tractor hitch including a member adapted to be secured to a trailer, a fifth wheel adapted to be secured to a tractor to rock thereon, means to connect the trailer member and fifth wheel to maintain the fifth wheel in normal position and to permit relative pivotal movement upon turning travel of the tractor, and tension means connected to the fifth wheel and tractor to exert a downward force upon the front end of the tractor.

4. A tractor hitch including a member adapted to be secured to a trailer, an element adapted to be pivotally secured to a tractor, the member and element having portions connected together for pivotal relative movement in a substantially horizontal direction and held against relative movement in a vertical direction whereby the member and element are substantially maintained in normal position, and tension means connected to the element and tractor to exert a downward force upon the front end of the tractor.

5. A tractor hitch including a member adapted to be secured to a trailer, an element adapted to be pivotally secured to a tractor, the member and element having portions connected together for pivotal relative movement in a substantially horizontal direction and held against relative movement in a vertical direction whereby the member and element are substantially maintained in normal position, tension means connected to the element and tractor to exert a downward force upon the front end of the tractor, and means adjustably to vary said tension means.

6. A tractor hitch including a member adapted to be secured to a trailer, an element adapted to be pivotally secured to a tractor, the member and element having portions connected together for pivotal relative movement in substantially horizontal direction and held against relative movement in a vertical direction whereby, upon raising of the front end of the tractor, the member and element may pivot with relation to the tractor and are substantially maintained in normal position, and means secured to the element and tractor to resist said front end raising.

7. A tractor hitch including a member adapted to be secured to a trailer, an element adapted to be pivotally secured to a tractor, the member and element having portions connected together for pivotal relative movement in a substantially horizontal direction and held against relative movement in a vertical direction whereby, upon raising of the front end of the tractor, the member and element may pivot with relation to the tractor and are substantially maintained in normal position, and means operable, upon movement of said connected member and element with relation to the tractor, to resist said front end raising.

8. A tractor hitch including a member adapted to be secured to a trailer, an element adapted to be pivotally secured to a tractor, the member and element having portions connected together for pivotal relative movement in a substantially horizontal direction and held against relative movement in a vertical direction whereby, upon raising of the front end of the tractor, the member and element may pivot with relation to the tractor and are substantially maintained in normal position, and means operable, upon movement of said connected member and element with relation to the tractor, to exert a force to resist said front end raising, said resisting means being adapted increasingly to exert said force in proportion to increase of said relative movement of member and element with the tractor.

9. A tractor hitch including a member adapted to be secured to a trailer, an element adapted to be pivotally secured to a tractor, the member and element having portions connected together for pivotal relative movement in a substantially horizontal direction and held against relative movement in a vertical direction whereby upon raising of the front end of the tractor, the member and element may pivot with relation to the tractor, and are substantially maintained in normal position, and tension means secured to the element and the tractor and adapted tensionably to resist said front end raising.

10. A tractor hitch including a member adapted to be secured to a trailer, an element adapted to be pivotally secured to a tractor, the member and element having portions connected together for pivotal relative movement in a substantially horizontal direction and held against relative movement in a vertical direction whereby, upon raising of the front end of the tractor, the member and element may pivot with relation to the tractor, and are substantially maintained in normal position, tension means secured to the element and the tractor and adapted tensionably to resist said front end raising, and means adjustable to vary the tension.

11. A tractor hitch including a member adapted to be secured to a trailer, an element adapted to be pivotally secured to a tractor, the member and element having portions connected together for pivotal relative movement in a substantially horizontal direction and held against relative movement in a vertical direction whereby, upon raising of the front end of the tractor, the member and element may pivot with relation to the tractor and are substantially maintained in normal position, an arm fixedly attached to said element, and tension means secured to said arm and the tractor to resist front end raising.

12. A tractor hitch including a fifth wheel pivotally secured to a tractor, tension means secured to the fifth wheel and tractor and adapted to hold the fifth wheel in a rearwardly and downwardly inclined coupling position, a draw-pin upwardly extending from said fifth wheel, a member adapted to be secured to a trailer, means on the forward portion of said member to engage said draw-pin whereby upon coupling of the fifth wheel and trailer member, the member will rock the fifth wheel into a substantially horizontal normal position, and said tension will exert a downward force upon the front end of the tractor.

13. A tractor hitch including a member adapted to be secured to a trailer, an element adapted to be mounted to rock upon the tractor, means to connect the member and element to maintain the element in normal position and to permit relative pivotal movement upon turning travel of the tractor, and tension means connected to the element and to the tractor to exert a downward force upon the front end of the tractor of sufficient power to prevent lifting thereof when said tractor and trailer are moving, said member-and-element connection being arranged to function independently of the angular relation of the member and element during turning.

14. A tractor hitch including a member adapted to be secured to a trailer, an element adapted to be movably mounted upon the tractor, and tension means connected to the movable element and tractor to exert a downward force upon the front end of the tractor substantially sufficient to prevent lifting thereof when the element and member are connected together.

15. A tractor hitch including an element adapted to be pivotally mounted upon a tractor above its driving axle and to rock relatively thereon in a front and rear direction, a member adapted to be secured to a trailer, means to connect the element and member whereby, upon raising of the front end of the tractor, the member tends to depress the portion of the element forward of its pivot relatively to the tractor, and tension means connected to said element and tractor and adapted, upon said relative depression of said forward portion of the element, to exert a downward force upon the front end of the tractor substantially sufficient to prevent lifting thereof when said tractor and trailer are moving 16. A tractor hitch including a fifth wheel pivotally secured to a tractor, tension means secured to the fifth wheel and tractor and adapted to hold the fifth wheel in a rearwardly and downwardly inclined coupling position, a member adapted to be secured to a trailer, coupling means for the fifth wheel and trailer member whereby, upon coupling, the member will rock the fifth wheel into a substantially horizontal normal position and said tension will exert a downward force upon the front end of the tractor of sufficient power to prevent said front end from lifting.

17. A tractor hitch including a member adapted to be secured to a trailer, the member being provided with a connection to the tractor to permit relative movement of tractor and member about vertical and horizontal axes, tension means connected to the member and tractor and adapted to exert a downward force upon the front end of the tractor, and means for varying said tension to counteract any tendency towards upward movement of said front end.

18. A tractor hitch including a member adapted to be secured to a trailer, the member being provided with a connection to the tractor to permit relative movement of tractor and member about vertical and horizontal axes, tension means connected to the member and tractor and constantly exerting a downward force upon the front end of the tractor when the member and tractor are connected, said force being substantially sufficient to prevent said front end from lifting when tractor and trailer are moving.

19. A tractor hitch including an element movably mounted upon the tractor, tension means connected to the element and tractor, trailer coupling means adapted to be connected to the element whereby said tension means is caused to exert a tensioned force upon the front end of the tractor.

20. A tractor hitch including a member adapted to be secured to a trailer, an element adapted to be pivotally secured to a tractor, the member and elements having portions connected together for pivotal relative movement in a substantially horizontal direction and held against relative movement in a vertical direction whereby, upon raising of the front end of the tractor, the member and element may pivot with relation to the tractor and are substantially maintained in normal position, and said element and member being connected to said tractor so as to substantially and constantly resist said front end raising, said element and member connection constituting the only connection between the trailer and tractor.

In witness whereof, I have hereunto set my hand this 1st day of December, 1922.

EDWARD R. GREER.